Patented Jan. 6, 1948

2,434,164

UNITED STATES PATENT OFFICE 2,434,164

SAW JOINTER

Sanford Johnson, Sioux City, Iowa

Application March 8, 1946, Serial No. 652,999

1 Claim. (Cl. 76—47)

My invention pertains to a saw jointer.

An object of my invention is to provide a device which will effectively straighten a saw blade, as well as straighten out the line of the saw teeth.

A further object of my invention is to provide a device which will straighten the blade adjacent to the teeth and at the same time straighten the teeth laterally as well as along the serrated points thereof.

A further object of my invention is to provide adjustable means so that the worn portions of part of the straightening arrangement can be moved laterally when it is worn out.

A further object of my invention is to provide an arrangement of this character which can be operated in a simple manner and which can be manufactured at a very reasonable cost.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of the arrangement,

Figure 2 is a side elevation of the device,

Figure 3 is a sectional view taken substantially along the lines 3—3 of Fig. 1, and Fig. 4 is a forward view of the arrangement.

I have used the character 10 to designate generally a saw blade which includes the teeth 11 and which is to be straightened by the device of my invention. The device itself comprises an angle member 12 and a further angle member 13, such members being identical, and pivoted to such members at 14 and 15 by means of the nut and bolt arrangement 16 are the links 17 having the extending ears 18, which ears receive the aforesaid nut and bolt arrangement 16. The links 17 are made of equal length so that regardless of the angular positioning thereof, the angles 12 and 13 will always be exactly parallel to each other. The links 17 also include the recessed portions at 19 through which is received a file 20 which file 20 is adapted to snugly bear against one of the angles 13 and which will slide against the other angle 12.

Attached at 21 to the angle 13 is the leaf or flat bar 22 which extends across the top of the file 20. Also attached at 21 is the bracket comprising the vertical portion 23 and the horizontal portion 24, which portion 24 threadably receives the lengthened machine screw 25 which machine screw is adapted to compress the bar 22 against the file 20 which, thereby, firmly secures the file against the angle 13 but not against the angle 12.

The arrangement is used in the following manner: The saw blade 10 is supported at the handle portion or at a portion slightly beyond that portion indicated by the character 26 in Fig. 2 by a suitable vise, and the device is then placed over the saw blade in the position substantially as indicated by the dotted structure in Fig. 1, which correspondingly causes the angles 12 and 13 to be at their widest separation. The hand, which is indicated by the character 27, is then placed with the forefinger 28 at one side of the forward link 17 and with the thumb 29 at the other, and the links are then forced to the solid position as shown in Fig. 1, which brings the parallel faces 30 of the angles 12 and 13 (see Fig. 4) snugly against the blade edge. The device is then forced along the upper blade edge and, as a result, the flanges 30 will straighten out the blade and teeth, and at the same time, the file 20 will straighten out the upper line of the serrated portions of the teeth, thereby providing a true blade.

Several successive strokes can be applied in this way to straighten out the blade, and when the file 20 is eroded or worn at one portion thereof, it can then be moved laterally to either side by means of loosening the machine screw 25 and thence retightening. It should be again noted that the file is only attached to one angle member 13 and not to the other, which allows the parallel positioning as desired.

It will now be seen that I have provided the advantages set forth in the objects of my invention with other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

A saw jointer comprising a pair of parallel saw abutting members adapted to receive a saw blade therebetween, links pivotally attached to said members to maintain the same in constant parallel position, means for moving said links to cause snug abutting relation between said members and a saw blade, said links having vertically upstanding portions to provide graspment means by the hand, a file attached to one of said abutting members for abutting the upper serrated edge of the saw teeth, said links having recesses for receiving said file, a bracket attached to one of said Jan. 6, 1948. J. W. JUVINALL 2,434,165
MANUFACTURE OF ELECTRIC LAMPS
Filed Aug. 18, 1943 3 Sheets-Sheet 1
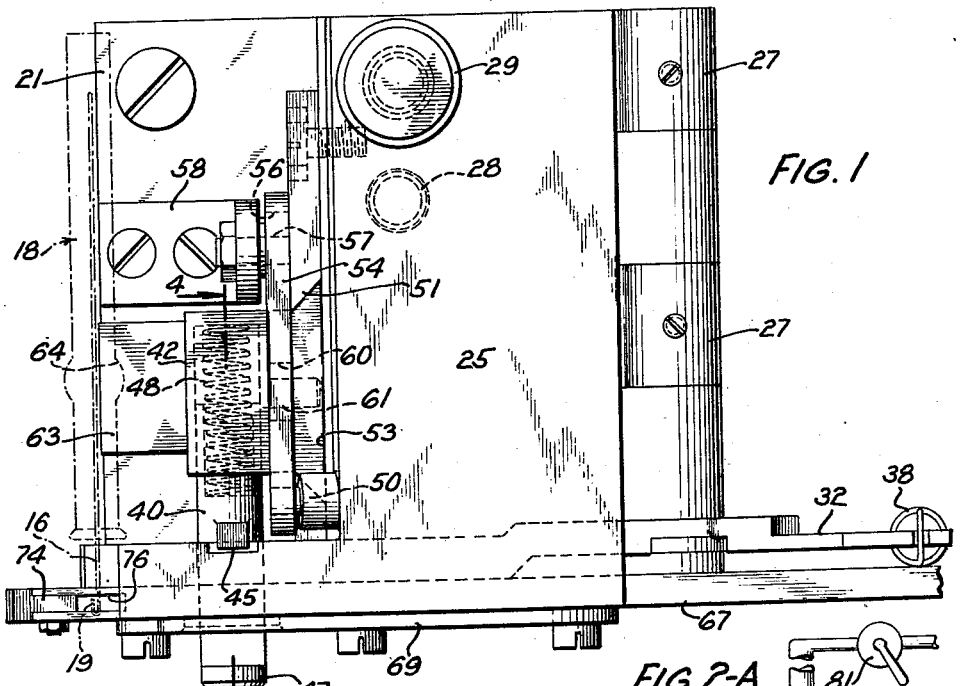
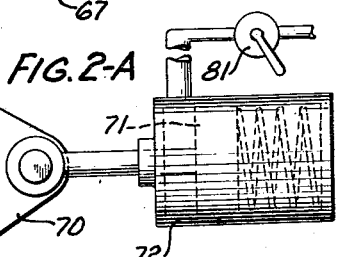
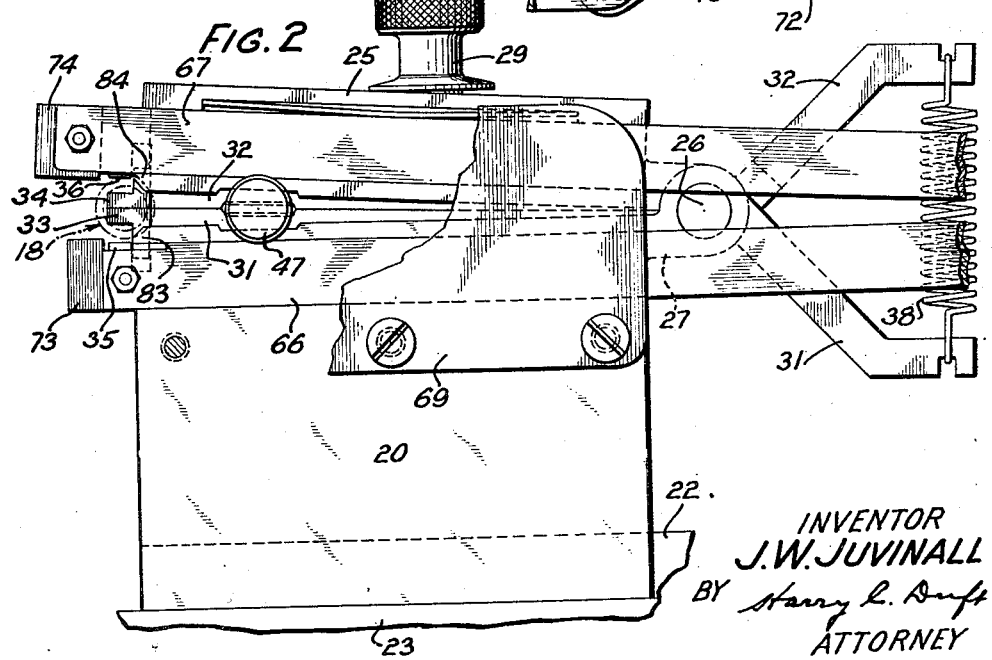
INVENTOR
J.W. JUVINALL
BY Harry L. Duft
ATTORNEY